(12) United States Patent
Kienzle et al.

(10) Patent No.: US 9,080,650 B2
(45) Date of Patent: Jul. 14, 2015

(54) MULTI-SPEED TRANSMISSION

(71) Applicant: GM Global Technology Operations LLC, Detroit, MI (US)

(72) Inventors: Kent H. Kienzle, Ann Arbor, MI (US); Dan Coffey, Howell, MI (US); David M. Zini, Novi, MI (US); John A. Diemer, Farmington Hills, MI (US); Pete R. Garcia, Troy, MI (US); Tejinder Singh, Commerce Township, MI (US); Boris Burgman, Oak Park, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 0 days.

(21) Appl. No.: 13/968,053

(22) Filed: Aug. 15, 2013

(65) Prior Publication Data

US 2014/0106924 A1    Apr. 17, 2014

Related U.S. Application Data

(60) Provisional application No. 61/715,002, filed on Oct. 17, 2012.

(51) Int. Cl.
*F16H 3/66* (2006.01)
*F16H 3/62* (2006.01)

(52) U.S. Cl.
CPC ............... *F16H 3/62* (2013.01); *F16H 3/663* (2013.01); *F16H 2200/0004* (2013.01); *F16H 2200/0065* (2013.01); *F16H 2200/201* (2013.01); *F16H 2200/2048* (2013.01)

(58) Field of Classification Search
CPC ..... F16H 3/62; F16H 3/66; F16H 2200/0065; F16H 2200/201; F16H 2200/2048

USPC .......................... 475/275–290, 330, 339, 340
See application file for complete search history.

(56) References Cited

U.S. PATENT DOCUMENTS

| | | | |
|---|---|---|---|
| 6,176,803 B1 | 1/2001 | Meyer et al. | |
| 6,723,018 B2 * | 4/2004 | Hayabuchi et al. | 475/276 |
| 6,984,187 B2 | 1/2006 | Biermann | |
| 7,128,683 B2 * | 10/2006 | Oguri et al. | 475/276 |
| 7,276,011 B2 * | 10/2007 | Tabata et al. | 475/276 |
| 7,384,364 B2 * | 6/2008 | Jang | 475/275 |
| 7,458,912 B2 * | 12/2008 | Oguri et al. | 475/275 |
| 7,931,558 B2 * | 4/2011 | Kato et al. | 475/275 |
| 8,357,069 B2 * | 1/2013 | Diemer et al. | 475/289 |
| 8,371,984 B2 * | 2/2013 | Diemer et al. | 475/289 |
| 2006/0019791 A1 * | 1/2006 | Baldwin | 475/275 |
| 2009/0270219 A1 * | 10/2009 | Kim | 475/276 |
| 2010/0234167 A1 * | 9/2010 | Lee et al. | 475/285 |
| 2012/0071289 A1 * | 3/2012 | Wittkopp et al. | 475/275 |
| 2012/0295756 A1 * | 11/2012 | Lee et al. | 475/289 |
| 2013/0203548 A1 * | 8/2013 | Mellet et al. | 475/276 |

FOREIGN PATENT DOCUMENTS

KR    1020110000403    1/2011

OTHER PUBLICATIONS

Pending U.S. Appl. No. 13/890,873, filed May 9, 2013, by Garcia et al. All pages.

\* cited by examiner

*Primary Examiner* — Roger Pang

(57) ABSTRACT

A transmission is provided having an input member, an output member, four planetary gear sets, a plurality of coupling members and a plurality of torque transmitting devices. The torque transmitting devices include clutches and brakes including a selectable one-way clutch actuatable in combinations of two to establish a plurality of forward gear ratios and one reverse gear ratio.

18 Claims, 4 Drawing Sheets

| GEAR STATE | GEAR RATIO | RATIO STEP | CLUTCHING ELEMENTS ||||||| 
|---|---|---|---|---|---|---|---|---|---|
| | | | 34 | 30 | 36 | 32 | 26 | 24 | 28 |
| REV | -2.960 | | X | | | | | X | |
| N | | -0.63 | | | | | | | |
| 1ST | 4.689 | | X | | | | | | |
| 2ND | 3.306 | 1.42 | | | X | X | | | |
| 3RD | 3.012 | 1.10 | | X | X | | | | |
| 4TH | 2.446 | 1.23 | | | X | | | | |
| 5TH | 1.923 | 1.27 | | | X | | | X | |
| 6TH | 1.446 | 1.33 | | X | | | X | | |
| 7TH | 1.000 | 1.45 | | | | | X | X | |
| 8TH | 0.747 | 1.34 | | | | X | X | | |
| 9TH | 0.617 | 1.21 | | | | | X | | X |

X = ON - ENGAGED CARRYING TORQUE

FIG. 4

MULTI-SPEED TRANSMISSION

CROSS-REFERENCE TO RELATED APPLICATIONS

This application claims the benefit of U.S. Provisional Application No. 61/715,002 filed Oct. 17, 2012. The disclosure of the above application is incorporated herein by reference.

FIELD

The invention relates generally to a multiple speed transmission having a plurality of planetary gear sets and a plurality of torque transmitting devices and more particularly to a transmission having nine speeds, four planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A transmission is provided having an input member, an output member, four planetary gear sets, a plurality of coupling members and a plurality of torque transmitting devices. The torque transmitting devices are for example clutches and brakes and include at least one selectable one-way clutch.

In another embodiment of the present invention, a transmission is provided having an input member, an output member, first, second, third and fourth planetary gear sets, three interconnecting members each connected directly to one of the first, second, and third planetary gear sets and to one other of the first, second, and third planetary gear sets, and seven torque transmitting devices each selectively engageable to interconnect at least one of the first, second, third, and fourth planetary gear sets with at least one other of the first, second, third, and fourth planetary gear sets and a stationary member. The torque transmitting devices are selectively engageable in combinations of at least two to establish a plurality of forward speed ratios and at least one reverse speed ratio between the input member and the output member.

In yet another embodiment of the present invention, one of the seven torque transmitting devices is a selectable one-way clutch that selectively couples one of the first, second, third, and fourth planetary gear sets to the stationary member.

In yet another embodiment of the present invention, the first, second, and third planetary gear sets each include a first member, a second member, and a third member and the fourth planetary gear set includes only a first member and a second member.

In yet another embodiment of the present invention, the first member of the fourth planetary gear set and the first and third members of the third planetary gear set are each meshed with at least one common stepped pinion.

In yet another embodiment of the present invention, the three interconnecting members include a first interconnecting member continuously interconnecting the first member of the first planetary gear set with the second member of the second planetary gear set.

In yet another embodiment of the present invention, the three interconnecting members include a second interconnecting member continuously interconnecting the second member of the first planetary gear set with the third member of the third planetary gear set.

In yet another embodiment of the present invention, the three interconnecting members include a third interconnecting member continuously interconnecting the third member of the second planetary gear set with the second member of the third planetary gear set.

In yet another embodiment of the present invention, the second members of the third and fourth gear sets are rotatingly coupled together.

In yet another embodiment of the present invention, a first of the seven torque transmitting devices is selectively engageable to interconnect the first member of the third planetary gear set with the input member.

In yet another embodiment of the present invention, a second of the seven torque transmitting devices is selectively engageable to interconnect the third member of the second planetary gear set, the second member of the third planetary gear set and the second member of the fourth planetary gear set with the first member of the second planetary gear set and the input member.

In yet another embodiment of the present invention, a third of the seven torque transmitting devices is selectively engageable to interconnect the second member of the third planetary gear set and the second member of the fourth planetary gear set with the first member of the fourth planetary gear set.

In yet another embodiment of the present invention, a fourth of the seven torque transmitting devices is selectively engageable to interconnect the first member of the third planetary gear set with the stationary member.

In yet another embodiment of the present invention, a fifth of the seven torque transmitting devices is selectively engageable to interconnect the first member of the fourth planetary gear set with the stationary member.

In yet another embodiment of the present invention, a sixth of the seven torque transmitting devices is a selectable one-way clutch that is selectively engageable to interconnect the second member of the fourth planetary gear set, the second member of the third planetary gear set, and the third member of the second planetary gear set with the stationary member.

In yet another embodiment of the present invention, a seventh of the seven torque transmitting devices is selectively engageable to interconnect the second member of the first planetary gear set with the stationary member.

In yet another embodiment of the present invention, the third member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members, the first member of the first planetary gear set, the third member of the second planetary gear set, and the third member of the third planetary gear set are ring gears.

In yet another embodiment of the present invention, the second members of the third and fourth planetary gear sets both support at least one stepped pinion member.

In yet another embodiment of the present invention, the output member is continuously interconnected with the second member of the first planetary gear set and the third member of the third planetary gear set.

In yet another embodiment of the present invention, the input member is continuously connected to the first member of the second planetary gear set.

Further features, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 4 is a truth table presenting the state of engagement of the various torque transmitting elements in each of the available forward and reverse speeds or gear ratios of the transmissions illustrated in FIGS. 1 and 2.

DETAILED DESCRIPTION

The following description is merely exemplary in nature and is not intended to limit the present disclosure, application, or uses.

At the outset, it should be appreciated that the embodiments of the multi-speed automatic transmissions of the present invention have an arrangement of permanent mechanical connections between the elements of the four planetary gear sets. For example, a first component or element of a first planetary gear set is permanently coupled to a second component or element of the second planetary gear set. A second component or element of the first planetary gear set is permanently coupled a third component or element of the third planetary gear set and to a third component or element of the fourth planetary gear set. A third component or element of the second planetary gear set is permanently coupled to a second component or element of the third planetary gear set and a second component or element of the fourth planetary gear set. A second component or element of the third planetary gear set is permanently coupled a second component or element of the fourth planetary gear set. A third component or element of the third planetary gear set is permanently coupled a third component or element of the fourth planetary gear set.

Figure 1:
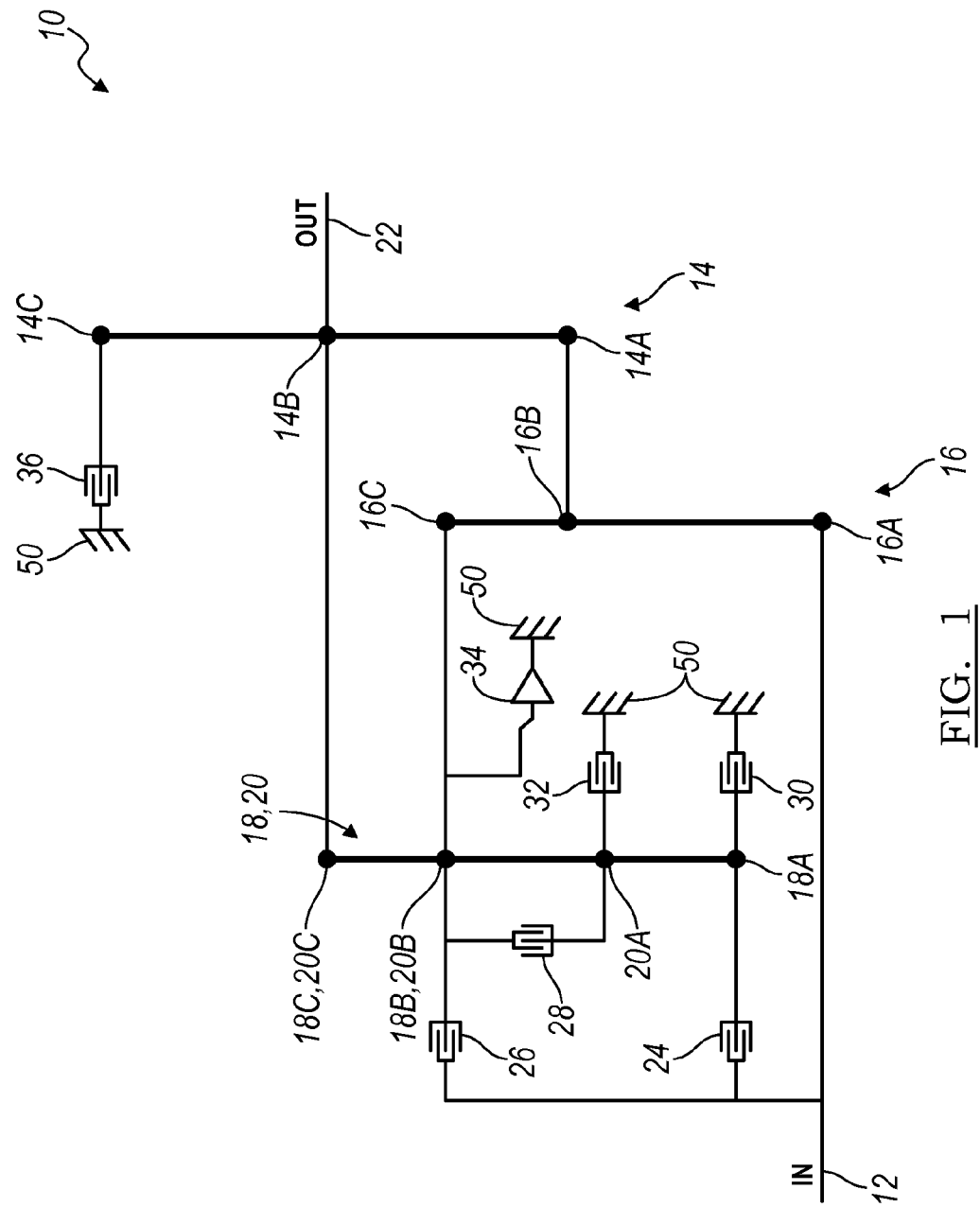
FIG. 1 is a lever diagram of a nine speed transmission according to the principles of the present invention.

Referring now to FIG. 1, an embodiment of a nine speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. In some cases, two levers may be combined into a single lever having more than three nodes (typically four nodes). For example, if two nodes on two different levers are interconnected through a fixed connection they may be represented as a single node on a single lever. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a first planetary gear set 14, a second planetary gear set 16, a third planetary gear set 18 and a fourth planetary gear set 20 and an output shaft or member 22. The first planetary gear set 14 has three nodes: a first node 14A, a second node 14B and a third node 14C. The second planetary gear set 16 has three nodes: a first node 16A, a second node 16B and a third node 16C. In the lever diagram of FIG. 1, the levers for the third planetary gear set 18 and the fourth planetary gear set 20 have been combined into a single four node lever having: a first node 18A, a second node 20A, a third node 18B, 20B, and a fourth node 18C, 20C. Thus, the second member 18B of the third planetary gear set 18 is coupled directly to the second member 20B of the fourth planetary gear set 20 and the third member 18C of the third planetary gear set 18 is coupled directly to the third member 20C of the fourth planetary gear set 20.

The input member 12 is continuously coupled to the first node 16A of the second planetary gear set 16. The output member 22 is coupled to the second node 14B of the first planetary gear set 14 and the fourth node 18C, 20C of the combined levers of the third and fourth planetary gear sets 18, 20. The first node 14A of the first planetary gear set 14 is coupled to the second node 16B of the second planetary gear set 16. The third node 16C of the second planetary gear set 16 is coupled to the third node 18B, 20B of the combined levers of the third and fourth planetary gear sets 18, 20.

A first clutch 24 selectively connects the first node 16A of the second planetary gear set 16 and the input member or shaft 12 with the first node 18A of the combined levers of the third and fourth planetary gear sets 18, 20. A second clutch 26 selectively connects the first node 16A of the second planetary gear set 16 and the input member or shaft 12 with the third node 18B,20B of the combined levers of the third and fourth planetary gear sets 18, 20 and the third node 16C of the second planetary gear set 16. A third clutch 28 selectively connects the third node 18B, 20B of the combined levers of the third and fourth planetary gear sets 18, 20 with the first node 20A of the fourth planetary gear set 20. The third clutch 28 may have various other configurations so long as the third clutch 28 connects one of nodes 18A, 20A, 18B, 20B, and 18C, 20C with another of the nodes 18A, 20A, 18B, 20B, and 18C, 20C. In one embodiment, the third clutch 28 is eliminated. In this configuration, the transmission 10 is a fully functional eight speed transmission. A first brake 30 selectively connects the first node 18A of the combined levers of the third and fourth planetary gear sets 18, 20 with a stationary member or transmission housing 50. A second brake 32 selectively connects the second node 20A of the combined levers of the third and fourth planetary gear sets 18, 20 with a stationary member or transmission housing 50. A third brake or selectable one-way clutch (SOWC) 34 selectively connects the third node 18B, 20B of the combined levers of the third and fourth planetary gear sets 18, 20 and the third node 16C of the second planetary gear set 16 with the stationary member or transmission housing 50. In an alternate embodiment the third brake 34 is a friction clutch, a dog clutch, or a synchronizer. A fourth brake 36 selectively connects the third node 14C of the first planetary gear set 14 with the stationary member or transmission housing 50.

Figure 2:
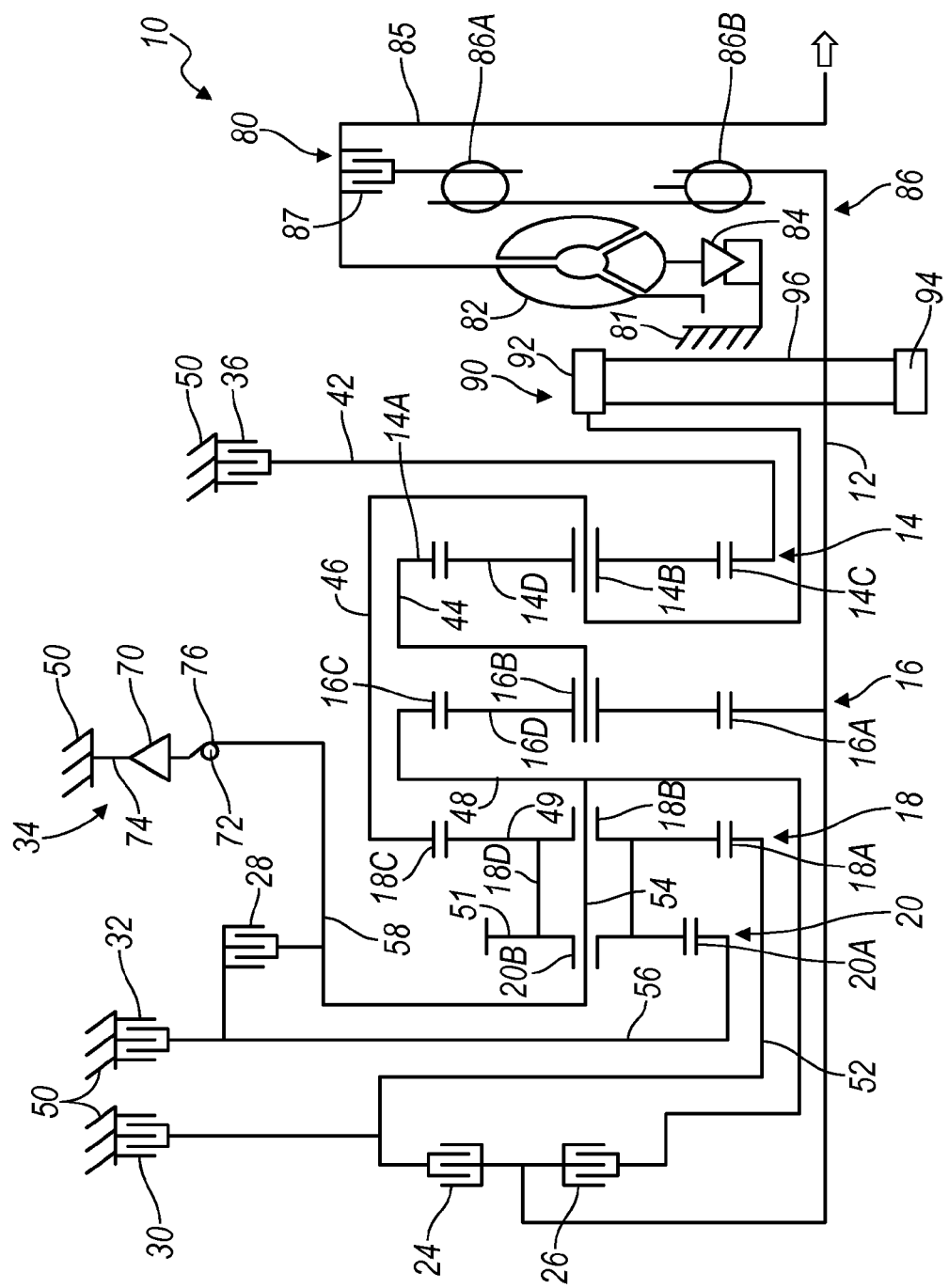
FIG. 2 is a diagrammatic illustration of an embodiment of a nine speed transmission according to the principles of the present invention.

Referring now to FIG. 2, a stick diagram presents a schematic layout of an embodiment of the nine speed transmission 10 according to the present invention. In FIG. 2, the numbering from the lever diagram of FIG. 1 is carried over. The clutches and couplings are correspondingly presented whereas the nodes of the planetary gear sets now appear as components of planetary gear sets such as sun gears, ring gears, planet gears and planet gear carriers. In an embodiment of the present invention, the four planetary gear sets 14, 16, 18 and 20 are simple planetary gear sets, as described below. However, the present invention contemplates other embodiments that replace the simple planetary gear sets with all or a combination of compound planetary gear sets having two or more sets of planet pinions supported by a single carrier member.

For example, the planetary gear set 14 includes a sun gear member 14C, a ring gear member 14A and a planet gear carrier member 14B that rotatably supports a set of planet gears 14D (only one of which is shown). The sun gear member 14C is connected for common rotation with a first shaft or interconnecting member 42. The ring gear member 14A is connected for common rotation with a second shaft or interconnecting member 44. The planet carrier member 14B is connected for common rotation with a third shaft or interconnecting member 46 and the output shaft or member 22. The planet gears 14D are each configured to intermesh with both the sun gear member 14C and the ring gear member 14A.

The planetary gear set 16 includes a sun gear member 16A, a ring gear member 16C and a planet gear carrier member 16B that rotatably supports a set of planet gears 16D (only one of which is shown). The sun gear member 16A is connected for common rotation with the input shaft or member 12. The ring gear member 16C is connected for common rotation with a fourth shaft or interconnecting member 48. The planet carrier member 16B is connected for common rotation with the second shaft or interconnecting member 44. The planet gears 16D are each configured to intermesh with both the sun gear member 16A and the ring gear member 16C.

The planetary gear set 18 includes a sun gear member 18A, a ring gear member 18C and a planet gear carrier member 18B that rotatably supports a set of stepped planet gears 18D (only one of which is shown). The stepped pinions 18D each have two different diameter portions 49 and 51, each portion corresponding to one of the gear sets 18 and 20, respectively. The sun gear member 18A is connected for common rotation with a fifth shaft or interconnecting member 52. The ring gear member 18C is connected for common rotation with the third shaft or interconnecting member 46. The planet carrier member 18B is connected for common rotation with the fourth shaft or interconnecting member 48 and with a sixth shaft or interconnecting member 54. The stepped planet gears 18D are each configured to intermesh with both the sun gear member 18A and the ring gear member 18C and with the planetary gear set 20 as described below.

The planetary gear set 20 includes a sun gear member 20A and a planet gear carrier member 20B that rotatably supports the set of stepped planet gears 18D (only one of which is shown). The sun gear member 20A is connected for common rotation with a seventh shaft or interconnecting member 56. The planet carrier member 20B is connected for common rotation with the sixth shaft or interconnecting member 54 and with an eighth shaft or interconnecting member 58. The stepped planet gears 18D are each configured to intermesh with the sun gear member 20A. The planetary gear set 20 does not include a ring gear member, thereby reducing the cost and packaging requirements of the planetary gear set.

The torque-transmitting mechanisms or clutches 24, 26, 28 and brakes 30, 32, 34 and 36 allow for selective interconnection of the shafts or interconnecting members, members of the planetary gear sets and the housing. The clutches 24, 26, 28 and brakes 30, 32, and 36 are friction, dog or synchronizer type mechanisms or the like, while the brake 34 is a SOWC. For example, the first clutch 24 is selectively engageable to connect the input shaft or member 12 with the fifth shaft or interconnecting member 52. The second clutch 26 is selectively engageable to connect the input shaft or member 12 with the fourth shaft or interconnecting member 48. The third clutch 28 is selectively engageable to connect the seventh shaft or interconnecting member 56 with the eighth shaft or interconnecting member 58. In one embodiment the third clutch 28 is applied through a bearing assembly where the actuating mechanism (piston) is non-rotating. The first brake 30 is selectively engageable to connect the fifth shaft or interconnecting member 52 with the stationary element or the transmission housing 50 in order to restrict the member 52 from rotating relative to the transmission housing 50. The second brake 32 is selectively engageable to connect the seventh shaft or interconnecting member 56 with the stationary element or the transmission housing 50 in order to restrict the member 56 from rotating relative to the transmission housing 50. The third brake or SOWC 34 is selectively engageable to connect the eighth shaft or interconnecting member 58 with the stationary element or the transmission housing 50 in order to restrict the member 58 from rotating relative to the transmission housing 50. The fourth brake 36 is selectively engageable to connect the first shaft or interconnecting member 42 with the stationary element or the transmission housing 50 in order to restrict the member 42 from rotating relative to the transmission housing 50.

The SOWC 34 generally includes a one-way clutch mechanism 70 and a locking mechanism 72. The clutch mechanism 70 generally includes an input 74 connected to the stationary member 50 and an output 76 connected to the eighth shaft or interconnecting member 58. The clutch mechanism 70 may be any type of one-way clutch including, but not limited to, roller, pawl, sprag, mechanical diode, and rocker clutches. The locking mechanism 72 selectively locks and unlocks the clutch mechanism 70 and may include rocker, diode, strut, or dog clutch type locking mechanisms. Several examples of selectable one-way clutches that may be used are described in SAE Paper No. SAE-2009-01-0509, which is herein incorporated by reference in its entirety.

When the SOWC 34 is unlocked, the SOWC 34 operates in the same manner as a traditional one-way clutch where the output 76 may rotate freely relative to the input 74 in a first rotational direction but may not rotate freely relative to the input 74 in a second opposite rotational direction. When the locking mechanism 72 is engaged or locked, the output 76 may not rotate relative to the input 74 in either rotational direction. It should be noted that the SOWC 34 may include up to four modes of operation. For example, the SOWC 34 may also include an open position. In the open position, the locking mechanism 72 unlocks the output 76 from the input 74 in both rotational directions. The SOWC 34 may also include another unlocked position where the SOWC 34 allows the output 76 to rotate freely relative to the input 74 in the second rotational direction but does not allow the output 76 to rotate freely relative to the input 74 in the first rotational direction.

The input shaft or member 12 is continuously connected to a torque convertor such as the starting device 80, and the output shaft or member 22 is continuously connected to an output transfer mechanism 90. The starting device 80 includes a torus 82 contained within a housing 81 coupled to the transmission housing 50. The torus 82 is connected to a stator through a one-way clutch 84 that insures that the torus rotates in only one direction. The torus 82 is also connected to the motor vehicle engine by a shaft or member 85. The starting device 80 further includes a dual spring/damper assembly 86 with two spring/dampers 86A and 86B. The spring/damper assembly 86 is selectively coupled to the torus 82 with a clutch 87 to minimize vibrations transmission to the transmission 10. Further, torque from the engine is transmitted to the transmission 10 when the clutch 87 is engaged. In other implementations, the starting device 80 can include a fluid clutch that is subjected to a slip effect and optionally provided with a lockup clutch, a wet or dry type friction clutch, or a P2 electric motor device.

The transfer mechanism 90 is coupled to the output shaft or member 22 with a pair of sprockets 92 and 94 connected together with a chain 96. With reference to FIG. 3A, the transfer mechanism 90 includes a planetary gear set with a sun gear member 98A, a ring gear member 98C and a planet gear carrier member 98B that rotatably supports a set of planet gears 98D. The sun gear member 98A is connected for common rotation with a shaft or interconnecting member 100. The ring gear member 98C is connected transmission housing 50. The planet carrier member 98B is connected for common rotation with an open differential such as a pinion/gear assembly 102. The planet gears 98D are each configured to intermesh with both the sun gear member 98A and the ring gear member 98C.

The pinion/gear assembly 102 includes a pin 114 that engages with a set of pinion gears 122 such that torque from the transmission 10 is transmitted through the pinion/gear assembly to a set of axles 106 and 108 that drive the front wheels of the motor vehicle. The transfer mechanism 90 further includes a pair of mechanisms 110 and 112 that engage with respective splines such that the transmission 10 is suitable for use in an all-wheel drive mode.

Figure 3B:
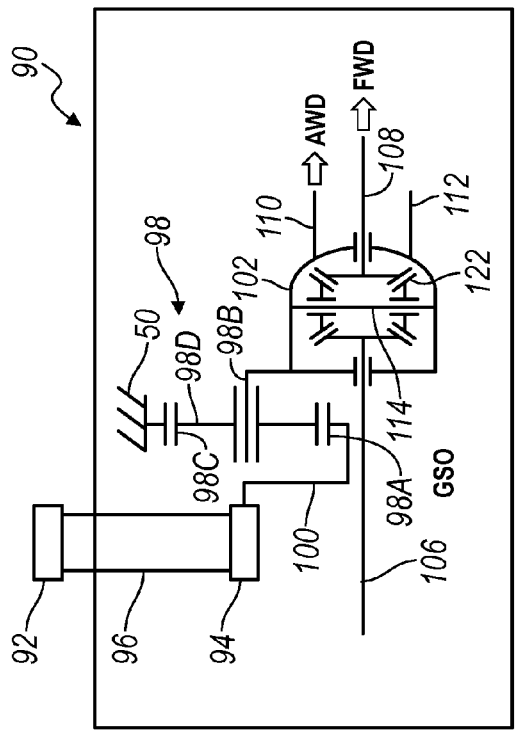
FIG. 3B illustrates another transfer mechanism for the transmission shown in FIG. 1 according to the principles of the present invention.
Figure 3A:
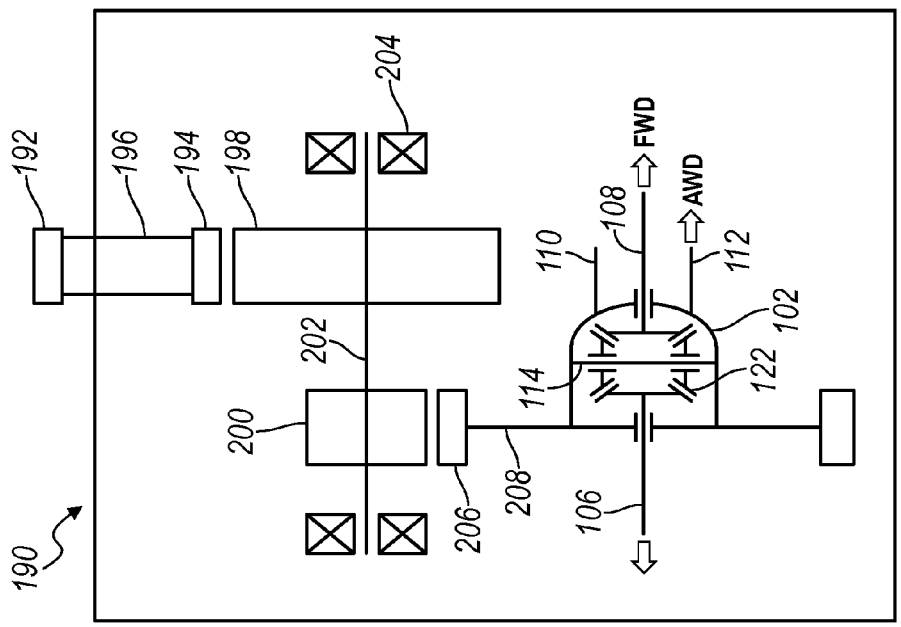
FIG. 3A illustrates a transfer mechanism for the transmission shown in FIG. 1 according to the principles of the present invention.

In another arrangement, the two-axis chain mechanism 90 is replaced by a three-axis gear transfer mechanism 190 shown in FIG. 3B. The transfer mechanism 190 includes a set of gears 192, 194, and 196 that are coupled to a large ring gear 198. The large ring gear 198 is attached to a shaft 202 supported by a set of bearings 204. A smaller ring gear 200 is also attached to the shaft 202 such that there is a multiplier effect between the large ring gear 198 and the small ring gear 200. Torque is transmitted from the gear 200 to another gear 206 which in turn rotates a shaft or member 208. The shaft or member 208 is connected to the pinion/gear assembly 102. The components and operation of the pinion/gear assembly 102 is the same as that described above with reference to the two-axis-chain transfer mechanism.

Referring now to FIG. 2 and FIG. 4, the operation of the nine speed transmission 10 will be described. It will be appreciated that transmission 10 is capable of transmitting torque from the input shaft or member 12 to the output shaft or member 22 in at least nine forward speed or torque ratios and at least one reverse speed or torque ratio. Each forward and reverse speed or torque ratio is attained by engagement of two or more of the torque-transmitting mechanisms (i.e. first clutch 24, second clutch 26, third clutch 28, first brake 30, second brake 32, third brake 34 and fourth brake 36), as will be explained below. FIG. 4 is a truth table that presents the various combinations of torque-transmitting mechanisms that are activated or engaged to achieve the various gear states. An "X" in the box means that the particular referenced clutch or brake is engaged to achieve the desired gear state. An "O" represents that the particular torque transmitting device (i.e. a brake or clutch) is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. Of course, other gear ratios are achievable depending on the gear diameter, gear teeth count and gear configuration selected.

With specific reference to FIG. 4, a truth table is presented illustrating a state of engagement of the various torque transmitting elements in each of the available forward and reverse speeds or gear ratios of the transmission 10. Accordingly, a reverse gear is established through the engagement or activation of the first clutch 24 and SOWC 34. The first clutch 24 connects the input shaft or member 12 with the fifth shaft or interconnecting member 52. The third brake 34 connects the eighth shaft or interconnecting member 58 with the stationary element or the transmission housing 50 in order to restrict the member 58 from rotating relative to the transmission housing 50. Likewise, the nine forward ratios are achieved through different combinations of clutch and brake engagement, as shown in FIG. 3.

The description of the invention is merely exemplary in nature and variations that do not depart from the gist of the invention are intended to be within the scope of the invention. Such variations are not to be regarded as a departure from the spirit and scope of the invention.

The following is claimed:

1. A transmission comprising:
    an input member;
    an output member;
    first, second, third and fourth planetary gear sets, wherein the first, second, and third planetary gear sets each include a first member, a second member, and a third member and the fourth planetary gear set includes only a first member and a second member each corresponding to one of a sun gear and a carrier member, and wherein the input member is continuously connected to the first member of the second planetary gear set;
    three interconnecting members each connected directly to one of the first, second, and third planetary gear sets and to one other of the first, second, and third planetary gear sets; and
    seven torque transmitting devices each selectively engageable to interconnect at least one of the first, second, third, and fourth planetary gear sets with at least one other of the first, second, third, and fourth planetary gear sets and a stationary member, and
    wherein the torque transmitting devices are selectively engageable in combinations of at least two to establish a plurality of forward speed ratios and at least one reverse speed ratio between the input member and the output member.

2. The transmission of claim 1 wherein one of the seven torque transmitting devices is a selectable one-way clutch that selectively couples one of the first, second, third, and fourth planetary gear sets to the stationary member.

3. The transmission of claim 1 wherein the first member of the fourth planetary gear set and the first and third members of the third planetary gear set are each meshed with at least one common stepped pinion.

4. The transmission of claim 1 wherein the three interconnecting members include a first interconnecting member continuously interconnecting the first member of the first planetary gear set with the second member of the second planetary gear set.

5. The transmission of claim 1 wherein the three interconnecting members include a second interconnecting member continuously interconnecting the second member of the first planetary gear set with the third member of the third planetary gear set.

6. The transmission of claim 1 wherein the three interconnecting members include a third interconnecting member continuously interconnecting the third member of the second planetary gear set with the second member of the third planetary gear set.

7. The transmission of claim 1 wherein the second members of the third and fourth gear sets are rotatingly coupled together.

8. The transmission of claim 1 wherein a first of the seven torque transmitting devices is selectively engageable to interconnect the first member of the third planetary gear set with the input member.

9. The transmission of claim 1 wherein a second of the seven torque transmitting devices is selectively engageable to interconnect the third member of the second planetary gear set, the second member of the third planetary gear set and the second member of the fourth planetary gear set with the first member of the second planetary gear set and the input member.

10. The transmission of claim 1 wherein a third of the seven torque transmitting devices is selectively engageable to interconnect the second member of the third planetary gear set and the second member of the fourth planetary gear set with the first member of the fourth planetary gear set.

11. The transmission of claim 1 wherein a fourth of the seven torque transmitting devices is selectively engageable to interconnect the first member of the third planetary gear set with the stationary member.

12. The transmission of claim 1 wherein a fifth of the seven torque transmitting devices is selectively engageable to interconnect the first member of the fourth planetary gear set with the stationary member.

13. The transmission of claim 1 wherein a sixth of the seven torque transmitting devices is a selectable one-way clutch that is selectively engageable to interconnect the second member of the fourth planetary gear set, the second member of the third planetary gear set, and the third member of the second planetary gear set with the stationary member.

14. The transmission of claim 1 wherein a seventh of the seven torque transmitting devices is selectively engageable to interconnect the second member of the first planetary gear set with the stationary member.

15. The transmission of claim 1 wherein the third member of the first planetary gear set, the first member of the second planetary gear set, the first member of the third planetary gear set and the first member of the fourth planetary gear set are sun gears, the second member of the first planetary gear set, the second member of the second planetary gear set, the second member of the third planetary gear set and the second member of the fourth planetary gear set are carrier members, the first member of the first planetary gear set, the third member of the second planetary gear set, and the third member of the third planetary gear set are ring gears.

16. The transmission of claim 13 wherein the second members of the third and fourth planetary gear sets both support at least one stepped pinion member.

17. The transmission of claim 1 wherein the output member is continuously interconnected with the second member of the first planetary gear set and the third member of the third planetary gear set.

18. A transmission comprising:
an input member;
an output member;
first, second, and third planetary gear sets each having first, second and third members each corresponding to one of a sun gear, a ring gear, and a carrier member, and a fourth planetary gear set having only first and second members each corresponding to one of a sun gear and carrier member;
a first interconnecting member continuously interconnecting the first member of the first planetary gear set with the second member of the second planetary gear set;
a second interconnecting member continuously interconnecting the second member of the first planetary gear set with the third member of the third planetary gear set;
a third interconnecting member continuously interconnecting the third member of the second planetary gear set with the second member of the third planetary gear set and the second member of the fourth planetary gear set;
a plurality of torque transmitting devices each selectively engageable to interconnect at least one of the first, second, and third members with at least one other of the first members, second members, third members and a stationary member, wherein one of the plurality of torque transmitting devices is a one-way clutch; and
wherein the torque transmitting devices are selectively engageable in combinations of at least two to establish a plurality of forward speed ratios and at least one reverse speed ratio between the input member and the output member.

* * * * *